Feb. 6, 1968          H. P. MEHR          3,367,579
SUPERSONIC CONVERGENT-DIVERGENT JET EXHAUST NOZZLE
Filed Dec. 8, 1965          2 Sheets-Sheet 1
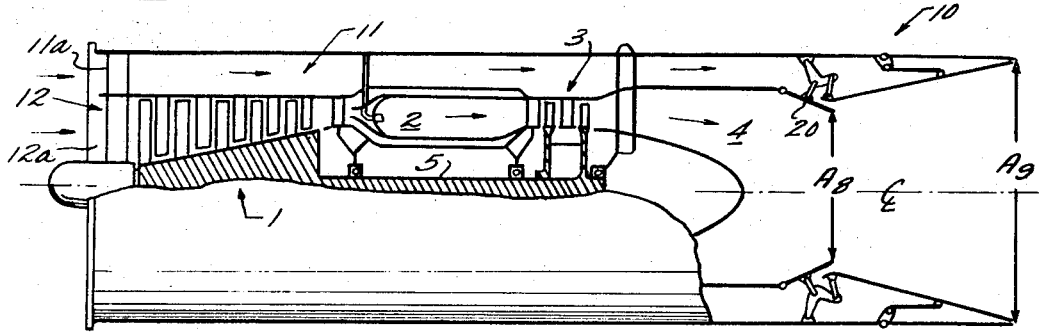
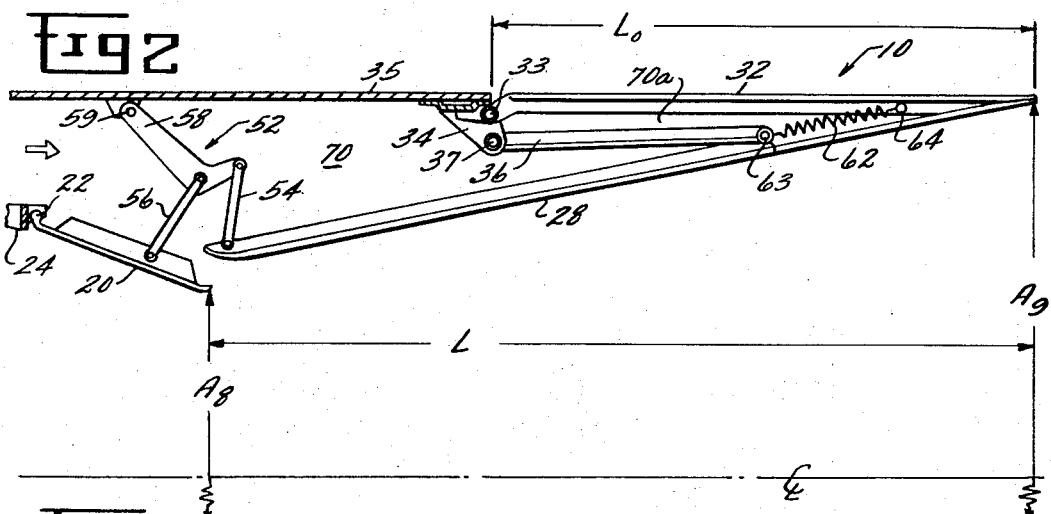
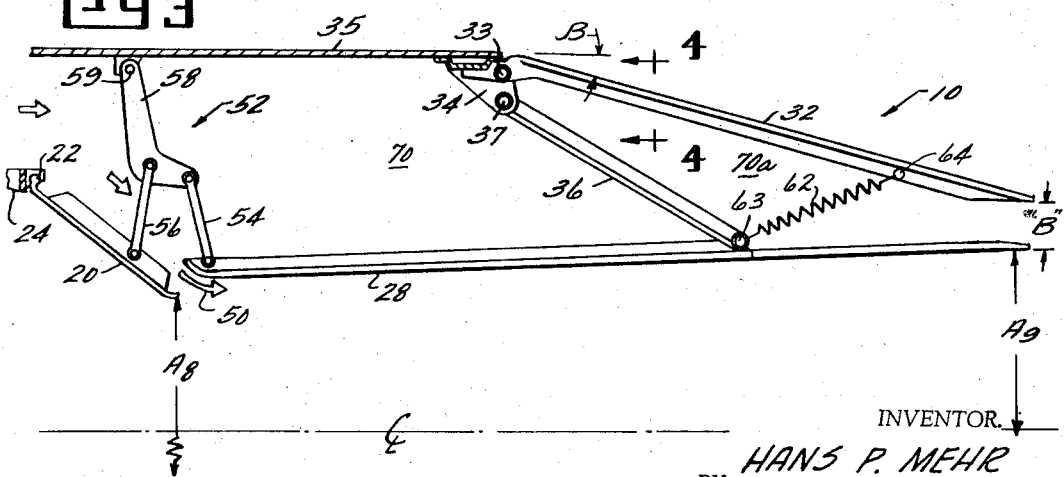
INVENTOR.
HANS P. MEHR
BY Harry C. Bergman
ATTORNEY

INVENTOR.
HANS P. MEHR 3,367,579
SUPERSONIC CONVERGENT-DIVERGENT JET
EXHAUST NOZZLE
Hans P. Mehr, Mason, Ohio, assignor, by mesne assignments, to the United States of America as represented by the Secretary of the Air Force
Filed Dec. 8, 1965, Ser. No. 512,317
10 Claims. (Cl. 239—265.41)

ABSTRACT OF THE DISCLOSURE

The invention comprises a jet engine exhaust nozzle of the convergent-divergent type, wherein the secondary or divergent portion thereof includes a plurality of movable flaps used for variation of the nozzle exit area and, simultaneously, to effect a variation of the nozzle expansion ratio ($A_9/A_8$). The divergent section of the nozzle includes a first plurality of outer flaps which are movable between an inward preselected "boattail" angle position and an outer zero angle for subsonic and supersonic operation, respectively. The divergent portion of the nozzle also includes a second plurality of movable flaps. The second set of flaps are pivotally connected to a plurality of longitudinally-extending inner movable wall members or flaps. Resilient means are connected between the second plurality of divergent section flaps and the first plurality of outer flaps. The first or outer plurality of movable flaps of the divergent section are then utilized to automatically control the base area or "boattail" angle with or without variation of the nozzle expansion ratio, for improved external, as well as internal nozzle performance under subsonic operating conditions. In addition, for a given aircraft mission requirement the ratio of the axial length (L) of the longitudinally-extending inner flaps of the divergent section to the distance ($L_o$) between the point which the outer divergent flaps are hingedly supported and the nozzle exit plane will be selected so that the secondary or divergent section of the nozzle will be "free-floating," i.e., the inner and both pluralities of outer flaps will move without application of mechanical force to a position of optimum performance.

---

The present invention relates to improvements in jet exhaust nozzles of the convergent-divergent type for use in supersonic aircraft and, more particularly, to such a nozzle having a "free-floating" adjustable secondary or divergent portion eliminating the need for a conventional actuation mechanism combined with means for maximizing external performance by reducing external drag.

Convergent-divergent exhaust nozzles, such as are currently used in jet engines for supersonic aircraft, essentially comprise a convergent passage which serves to accelerate the exhaust gas to sonic velocity, followed by a divergent passage which expands the exhaust gas to supersonic velocity. Typically, the convergent and divergent sections of the exhaust nozzle each consist of a plurality of movable wall members against which the exhaust gas stream exerts force to increase the effective thrust or operating efficiency of the engine. To expand the exhaust gas efficiently, the nozzle exit area or outlet of the divergent section (symbolized $A_9$) must bear a definite relation to the nozzle throat area or outlet of the convergent section (symbolized $A_8$). The throat area, being the minimum cross-sectional area in the nozzle, will determine the mass flow rate of the working fluid passing through the exhaust nozzle at a given pressure ratio across the throat at a given temperature. As is well known, the "critical" pressure ratio is the maximum pressure ratio that can be attained across the throat portion of the nozzle. The critical pressure ratio is achieved when the velocity of the working fluid passing through the nozzle is at the local velocity of sound. This occurs at approximately a pressure ratio of 1.89. Any further increase in the pressure of the working fluid merely results in expansion of the fluid downstream of the throat to ambient or atmospheric pressure, the pressure ratio across the throat remaining at the critical level. Thus, any such increase in the pressure of the working fluid downstream of the throat produces little further increase in the amount of useful energy in the form of thrust extracted from the working fluid unless the divergent section is provided. The "convergent-divergent" nozzle thus can provide a maximum amount of useful thrust from the complete expansion of the working fluid in the nozzle from a pressure ratio greater than critical to ambient.

In aircraft designed for operation over a wide range of speeds, i.e., a wide range of nozzle pressure ratios, such as supersonic aircraft, the aforementioned movable wall members are usually provided for varying the degree of divergence in the convergent-divergent nozzle. This will result in changing the "expansion ratio" of the nozzle, the expansion ratio being defined as the ratio of the exit area ($A_9$) to the throat area ($A_8$). In practice it has been found desirable, for optimum efficiency and maximum thrust over a wide operating range, that the nozzle also incorporates means to vary the cross-sectional area of the nozzle throat, generally in accordance with the engine power setting. Such nozzles therefore incorporate separate sets of movable wall members or flaps for both the secondary and primary sections in order to vary the exit area, as well as the throat area. Heretofore means have also been required for actuation of these flap members to achieve the desired area variations for a given mission requirement, which will include take-off, subsonic loiter and supersonic cruise operation of the air vehicle. It will be obvious to those skilled in the art that the ever-increasing requirements for more speed and efficiency dictate the need for using lightweight components whenever possible. Taking this principle a step further, it will be appreciated that considerable cost savings, efficiency, economy of operation, increased reliability and improved performance may be achieved by the elimination of the relatively heavy, complex, and expensive hydraulic or other mechanical actuator systems heretofore required for achieving variation of throat and exit areas. As described hereinbelow this may be accomplished by my novel system for causing the movable wall members or flaps to aerodynamically "float" to the desired position.

For a convergent-divergent nozzle design to operate most efficiently it must have, in addition to high internal performance under all conditions, low "base drag" and "boattail angle." Particularly is this true under subsonic operating conditions. To explain, the projected angle which the outer surface of the divergent section of a nozzle makes with the axis of an engine is conventionally known as the "boattail" angle. The drag on this outer surface is known as the boattail drag and it increases with increasing boattail angle. For low boattail drag it is important that this angle be small but this requires a long outer flap and this is not always practical from a mechanical or design standpoint. In addition, for a "floating" nozzle where the outer flaps must be shorter than the inner divergent section flaps, weight considerations would prohibit making long outer flaps. It will therefore be necessary to cut off, or shorten the fairing or outer flap portion at some point in order that whatever performance gains are realized by low "boattail" angle are not lost due to added weight from an extremely long external surface. Depending upon the operating regime or the vehicle flight speed, however, the pressure at the extreme downstream end of the nozzle may vary so that if the nozzle were cut off too sharply, so as to greatly enlarge the nozzle rear face, or what is known as the "base" area, this pressure could create considerable "base" drag. Therefore, it will be desirable to provide a fairing-in type of nozzle outer divergent portion to insure a low "boattail" angle, the outer fairing or support member being cut off at some optimum point. Essentially the problem facing the designer is that of making sure that the internal nozzle pressure is maximized relative to the outer nozzle pressure since the outer pressure acts on the "base" area and faired portion, pushing opposite to the direction of flight.

It is, therefore, a primary object of this invention to provide an improved convergent-divergent jet exhaust nozzle for supersonic aircraft incorporating means for achieving variations in the nozzle expansion ratio without the need for an actuating mechanism for this purpose, in combination with means for reducing external drag, thus increasing overall engine performance.

More specifically, it is an object of this invention to provide a supersonic nozzle combining improvements wherein variations in the nozzle exit area are aerodynamically achieved by a "free-flowing" secondary or divergent nozzle section together with means for reducing drag resulting from the external nozzle configuration.

Briefly stated, the invention is directed to a jet engine exhaust nozzle of the convergent-divergent type, wherein at least the secondary or divergent portion thereof includes a plurality of movable wall members or flaps used for variation of the nozzle exit area and, simultaneously, to effect a variation of the nozzle expansion ratio ($A_9/A_8$). Specifically, the divergent section of the nozzle includes a first plurality of outer flaps which are movable between an inward preselected "boattail" angle position and an outer zero angle, zero "base" position for subsonic and supersonic operation, respectively. This outer set of longitudinally-extending divergent section flaps are pivotally hinged at their upstream ends to an outer shroud or nacelle. The divergent portion of the nozzle also includes a second plurality of movable wall members or flaps. Each of these latter flaps are pivotally connected at one end to the outer shroud or nacelle adjacent the hinge point of the outer set of flaps. The other end of the second set of flaps are pivotally connected to a plurality of longitudinally-extending inner movable wall members or flaps. Resilient means are connected between the said other ends of the second plurality of divergent section flaps and the first plurality of outer flaps. The first or outer plurality of movable wall members of the divergent section are then utilized to automatically control the base area or "boattail" angle with or without variation of the nozzle expansion ratio, for improved external, as well as internal nozzle performance under subsonic operating conditions, in particular. In addition, for a given aircraft mission requirement the ratio of the axial length (L) of the longitudinally-extending inner flaps of the divergent section to the distance ($L_0$) between the point at which the outer divergent flaps are hingedly supported and the nozzle exit plane ($A_9$), will be selected so that the secondary or divergent section of the nozzle will be "free-floating," i.e., the inner and both pluralities of outer flaps will move without application of mechanical force to a position of optimum performance.

While the specification concludes with claims particularly pointing out and distinctly claiming the subject matter which I regard as my invention, it is believed that the invention and further advantages and objects thereof may be better understood from the following detailed description taken in connection with the accompanying drawings in which:

FIG. 1 is a diagrammatic cross-sectional view of a typical turbojet engine utilizing the exhaust nozzle of the invention;

FIG. 2 is an enlarged partial diagrammatic view of the jet engine exhaust nozzle of FIG. 1 with the nozzle flaps shown in a position for thrust augmentation or supersonic cruise operation;

FIG. 3 is a view similar to FIG. 2 showing the nozzle in position for subsonic operation;

Figure 4:
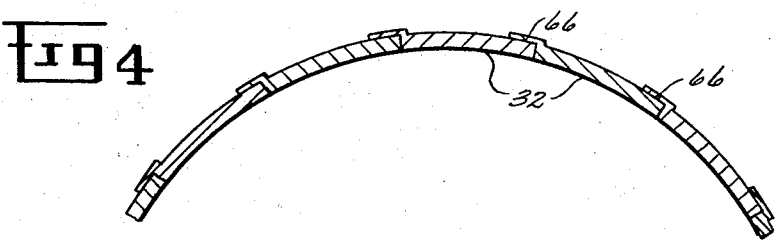
FIG. 4 is a view taken along line 4—4 of FIG. 3.

Turning now specifically to the drawings, FIG. 1 is a cross-sectional view of a typical jet engine of the turbojet variety. For example, there is a rotating axial-flow compressor 1, combustion means 2 for heating and increasing the velocity of the compressed air received from the compressor, and power turbine means 3. The power turbine expands the hot gases from the combustion section into the tailpipe area 4 from whence the gases are exhausted to the atmosphere. A part of the power output of the turbine is, of course, used to drive the compressor through a shaft 5 connecting the two rotating components. The available energy in the exhaust gas stream of the turbojet engine is converted to kinetic energy or thrust of the jet. As explained above, it is necessary for optimum operating efficiency to take advantage of all the thrust or reaction force available in the exhaust gas stream. In the case of supersonic aircraft, in particular, it is necessary to do this over a wide range of operating conditions and exhaust nozzle pressure ratios. To provide this optimum wide range operating capability, the turbojet illustrated in FIG. 1 is provided with the improved convergent-divergent exhaust nozzle of my invention, indicated generally at 10. While for ease of illustration a conventional turbojet gas turbine engine has been described, it should be understood that the invention incorporated in the nozzle will be equally useful to the operation of a turbofan type of gas turbine wherein a fan or low pressure compressor (not shown) is provided in an auxiliary duct indicated at 11 coaxially arranged around the primary duct 12 containing the basic gas generator described hereinabove. In the gas turbine cycle arrangement depicted in FIG. 1, the primary air stream enters inlet area 12a and goes through the axial-flow compressor 1 to be heated in and expanded in the manner described, while, at the same time, the secondary air stream enters inlet 11a, passing through the secondary passage 11. The secondary air can be utilized to aid in achieving aerodynamic control or variation of the expansion ratio ($A_9/A_8$) of the exhaust nozzle, as hereinafter described.

As shown in the drawings, the throat or convergent portion of the nozzle is designated by the plane $A_8$, while the exit area is designated by the plane $A_9$. While not absolutely essential to the operation of the engine, for improved efficiency the convergent portion of the nozzle may comprise a plurality of movable flaps or fingers, one of which is indicated at 20 in FIG. 2. The throat area $A_8$ is thus formed by the series of circumferentially arranged primary flaps which in the disclosed embodiment are pivotally attached at 22 to a tailpipe duct 24. The divergent or secondary portion of the convergent-divergent nozzle 10 is likewise formed by one or more series of circumferentially arranged flaps or movable wall members.

Specifically, in the embodiment disclosed in FIGS. 2 and 3 the nozzle secondary or divergent section includes a plurality of longitudinally-extending inner flaps, one of which is indicated at 28, forming an internal adjustable wall for the nozzle 10. In addition, there is a first or primary set of outer flaps or movable wall members, one of which is indicated generally at 32. In this arrangement the outer flaps 32 are pivotally attached by hinge means 33 to a support 34 at the downstream end of a nacelle or housing 35. The nozzle also includes a second plurality of flaps or wall members 36. One end of each member 36 is pivotally attached by hinge means 37 to support means 34 adjacent the hinge point 33 for the outer flaps 32. At the opposite or downstream ends of the second plurality of members 36 means are provided at 63 for pivotally attaching the members 36 to the outer surface of the inner flaps 28 of the divergent or secondary section, for a function hereinafter described.

It may also be desirable to provide controlled egress of secondary air, indicated by arrows, from passage 11. To this end, a controlled secondary air gap 50 may be provided. Gap 50 is located between the downstream ends of the primary flaps 20 and the upstream ends of the inner divergent section flaps 28. Means controlling the area of the gap 50 during movement of the several pluralities of flaps may be provided in the form of suitable automatically adjustable linkage mechanism, indicated generally at 52. In the example illustrated the mechanism comprises links 54 and 56, pivotally attached to inner divergent flaps 28 and primary flaps 20, respectively. The links in turn are pivotally connected through a bellcrank 58 to the outer housing or nacelle at 59.

It will be noted in FIG. 2, in particular, which is taken along a horizontal plane through the engine, that the axial length ($L_0$) that is, the distance from hinge point 33 to the exit plane $A_9$, is significantly less than the axial length of the inner divergent flaps 28. It is by specifically controlling the ratio $L_0/L$ for a given aircraft mission or engine operating requirement that the "free-floating" or aerodynamic positioning of the secondary or divergent portion of the nozzle is accomplished, in accordance with my invention. If then the upstream ends of flaps 36 are attached in approximately the same plane as the hinge point 33 for flaps 32, and further, the downstream pivot point for the flaps 36, i.e., where each flap attaches to a flap 28, is located at a point equal to at least $L_0/L$ from point 33, the proper forces for "floating" action will be achieved.

In other words, the pressure differential across the flaps 28 and 36 are such that the flaps move without the application of mechanical actuation forces. Specifically, the pressure differential existing across each flap 28, from its upstream end to hinge point 63, is a result of the static gas pressure on the *inner* surface of the nozzle exhaust passage opposed by the secondary air pressure forces in cavity 70 exerted on the *outer* surface of the flap 28, as well as on the inner surfaces of flaps 36. In addition, flaps 28, from hinge point 63 to exit plane $A_9$ are subject to a pressure differential caused by the static gas pressure opposed by the pressure in cavity 70a, the latter being essentially at ambient. Conversely, flaps 36 experience a pressure differential caused by cavity 70 pressure forces opposed by cavity 70a pressure. Thus, point 63 will be located such that under subsonic or low nozzle pressure ratio ($P_8/P_0$) operating conditions, the pressure differentials on flap 28, i.e., in cavity 70, causes the nozzle to tend to close, rather than open, under the force of the exhaust gas stream static pressure.

The secondary air pressure in passage 11 and cavity 70 may be controlled by either adjustment of the inlet area 11a by suitable closure means (not shown), or by controlling the size of gap 50 by automatic adjustment of linkage 52 with the result that there is a net closing force on the nozzle. Actuators (not shown) may be, of course, provided to move the primary flaps and the connected portion of link mechanism 52. While adjustment of the throat area ($A_8$) for efficient subsonic operation by moving the primary flaps 20 will result in the secondary nozzle "floating" to another position, due to the linkage arrangement, the annular gap 50 remains substantially unchanged. Thus, in combination with the proper preselected $L_0/L$ ratio, it is this control of the motive fluid expansion or static pressure in the divergent portion of the convergent-divergent nozzle, together with the controlled secondary air pressure, that "floats" the nozzle to the optimum position.

For a supersonic engine exhaust nozzle to operate even more efficiently, however, in addition to having high internal performance and increased efficiency of operation due to the elimination of the need for flap actuating mechanisms made possible by the improvements described hereinabove, it is also desirable to minimize "base" or "boattail" drag particularly at off-design or subsonic conditions of operation. To this end, the invention provides further means whereby when the nozzle is in the closed or inward position (see FIG. 3) it will be adjusted for optimum "boattail" angle B to provide minimum "boattail-base" drag preferably in the order of 10°–20°, and, while in the open position, form a cylindrical surface having zero "boattail" angle and zero "base" drag. Thus, as shown in FIGS. 1 through 4, the outer divergent flaps 32 are spring-loaded inward by resilient means 62 pivotally connected at hinge point 63 to the outer surface of the flaps 28 and at point 64 to the flaps 32. In the minimum or inward position, the outer flaps 32 form a continuous conical surface, as shown in the cross-sectional view of FIG. 4, through means of an overlapping arrangement of seals 66. The design of the spring 62 and the attachment points thereof to the flaps are selected so that annular area B of FIG. 3 may be adjusted for a combined minimum "boattail-base" drag depending on the operating regime. Thus, while shown in abutment along their sides in FIG. 4, the flaps 32 could be varied in width to permit a complete closing down to the point at which the downstream ends of the flaps 32 would rest on the upper surface of the flaps 28. In this manner, the "boattail" angle may also vary depending on whether the engine or aircraft is operating at cruise design or at an off-design point.

The movable wall members or flaps 36 are thus used both for support and for controlling the position of the inner divergent flaps 28, as well as to provide a cavity 70 to aid in creating the necessary pressure differential, described above, to cause the divergent flaps to "float" to the required position. The outer flaps 32 control "boattails" angle $\beta$ and "base" area B through means of the pressure in cavity 70a and the spring tension in members 62. Any leakage flow past the secondary flaps 36 of the disclosed embodiment will not cause as high a performance loss as is usually incurred by conventional nozzles since the flow is directed into the nozzle "base" area B where it will result in increasing the pressure in the base area, thereby actually tending to reduce the nozzle base drag.

Viewing it another way, in the subsonic operating regime optimum propulsive efficiency of the nozzle is achieved when the exit area ($A_9$) is only slightly larger than the throat area ($A_8$). At this point the expansion ratio ($A_9/A_8$) is at a minimum. This will prevent overexpansion of the working fluid below atmospheric pressure. In this operating regime, secondary air from passage 11 exits through the annular gap 50 to control the rate at which the relatively low velocity secondary air of passage 11 will fill the annular area that separates the working exhaust gas stream or jet and the atmospheric air stream passing over the engine nacelle at the exit area of the engine, or at the downstream end of outer flaps at 32. As will be seen in the drawings, the spring-loaded dual outer flap arrangement permits selective "boattail" angle setting, as well as controlled "base" area. That is, it is possible by selection of spring rates, controlled leakage and pressure differential differences to adjust area B and angle $\beta$ to obtain minimum externally caused drag. Conversely, during transonic or intermediate pressure nozzle operation, the divergent portion of the nozzle operates to expand the pressure of the motive fluid in excess of the critical pressure ratio to approximately atmospheric pressure. This increases the velocity of the working fluid to the supersonic value necessary for efficient operation of the air vehicle. At this point the secondary or divergent portion of the nozzle will be adjusted so that the motive fluid is not expanded further. In other words, the $A_9/A_8$ ratio is chosen for the most efficient use of the thrust available in the gas stream. If the flight speed is now increased to a value greatly in excess of supersonic velocity the pressure of the gas stream which enters inlets 11a and 12a is materially increased. At this point the divergent portion of the nozzle section must be enlarged to expand the motive fluid to substantially atmospheric pressure. For this reason an increased ratio of the exit area to throat area, i.e., $A_9/A_8$, must be accomplished. As explained above, as the primary motive fluid leaves the convergent section it will continue to expand and decrease in static pressure in the secondary portion. For example, for a given turbojet engine, at Mach 1.2 (1.2×the speed of sound under standard conditions) an internal nozzle expansion ratio of about 2.0 is indicated for optimum internal performance of the nozzle. For a floating nozzle, due to relatively short outer flaps, this is not the position of optimum installed performance (internal performance minus "boattail" drag) and an improvement in the installed performance can be realized by letting the nozzle "float" to an area ratio of 2.2 to 2.4. For a given nozzle, therefore, the "floating" position expansion ratio $A_9/A_8$ is determined by what I have termed the "floating parameter" or $L_0/L$. For example, for the divergent section of the illustrated nozzle to "float" to a position of optimum installed efficiency during transonic acceleration an $L_0/L$ ratio of between .5 and .7 is required. Obviously, for different engine and aircraft mission requirements slightly different $L_0/L$ ratios may be selected. In any event, the ratio will be chosen such that the divergent nozzle flaps will "float" to the desired positions. Further description of the "floating" convergent-divergent supersonic exhaust nozzle concept is contained in my application of common assignment filed even date herewith entitled "Improved Convergent-Divergent Jet Exhaust Nozzle for Supersonic Aircraft."

Figure 5:
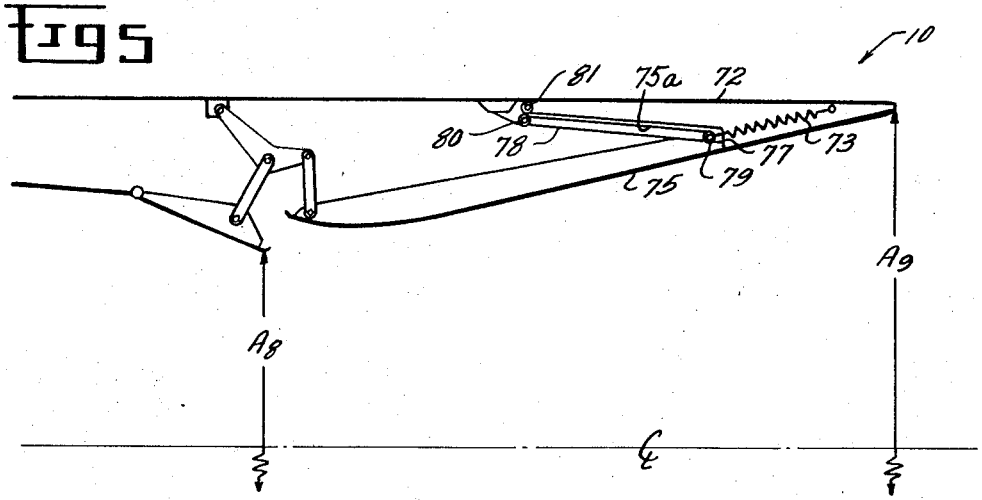
FIGS. 5 and 6 are views similar to those of FIGS. 2 and 3, respectively, but illustrating an alternate embodiment of the improved jet exhaust nozzle of the invention.
Figure 6:
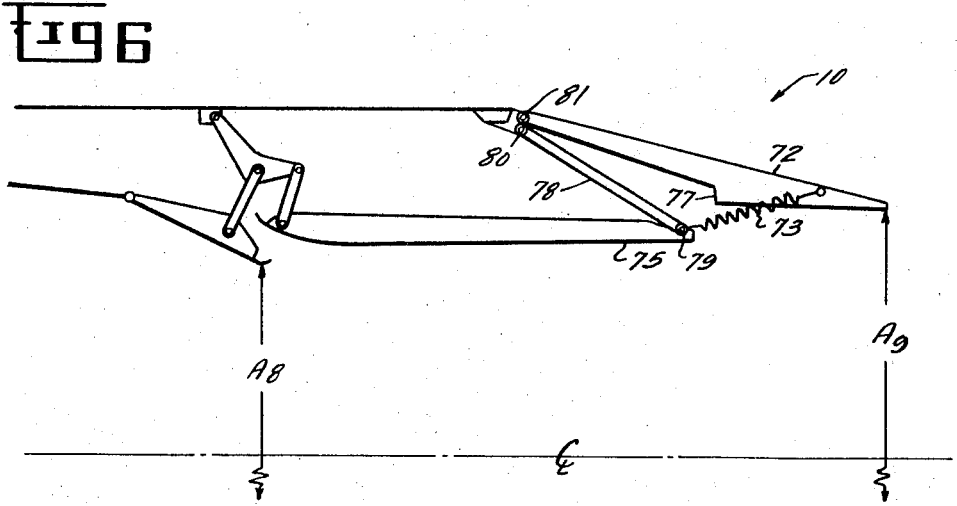

In the alternate embodiment of the invention illustrated in FIGS. 5 and 6, a plurality of modified outer flaps 72 are shown in their maximum open position in FIG. 5. The flaps 72 are spring-loaded inwardly by means of resilient means 73. In this arrangement, the inner divergent flaps 75 are foreshortened and in the supersonic operating position nestle within a cavity 77 in the inner surface of the outer divergent flaps 72. A second plurality of divergent flap members 78 located outwardly of flaps 75 are provided. Flaps 78 are pivotally connected at 79 and 80 to the inner flaps 75 and adjacent the upstream ends of the outer flaps 72, respectively. For adjustment of the "boattail" angle, flaps 72 are similarly hinged at 81 to the downstream end of the outer duct or housing. In this latter embodiment, the outer flaps 72 form a portion of the inner wall 75a of the divergent section. This arrangement reduces somewhat the forces acting on the secondary divergent wall members 78 due to shortening of the inner flaps 75, as compared to the flaps 28 of the previous embodiment.

It will be understood that a significant advantage presented by this invention is that by the addition of a "second" plurality of outer flaps, i.e., providing the dual outer divergent flap arrangement illustrated in the drawings, the external "boattail" angle configuration or "base" area can be optimized without affecting the internal nozzle area ratio or performance. Thus, external and internal performance can be optimized independently. This is particularly important and desirable whenever the aircraft design calls for a large outer shroud or nacelle diameter. Heretofore, with a large diameter nacelle it was impractical, because of weight and reliability requirements, to make the nozzle sufficiently elongated for optimization of both external and internal performance. Furthermore, any total weight added by the additional flaps, if a problem, can be more than compensated for by shortening of the external flaps and locating the hinge point as shown in the FIGS. 5 and 6. With the correct $L_0/L$ ratio, however, weight is actually reduced rather than increased.

While particular embodiments of the means of the present invention have been disclosed, it will be obvious to those skilled in the art that various changes and modifications may be made in such embodiments without departing from the spirit or scope of the invention, and it is therefore intended in the appended claims to cover all such variations and modifications.

What I claim and desire to secure by Letters Patent is:

1. A variable area convergent-divergent supersonic jet engine exhaust nozzle comprising:
   a first plurality of circumferentially-arranged, longitudinally-extending movable wall members defining an exhaust gas flow passage in said nozzle;
   a second plurality of circumferentially-arranged, longitudinally-extending wall members pivotally attached to said first plurality for support thereof in said engine;
   a third plurality of circumferentially-arranged, longitudinally-extending movable wall members pivotally supported at their upstream ends in said engine and located outwardly of said first and second pluralities; and
   resilient means connecting said third plurality of movable members to said first plurality, whereby under subsonic operating conditions said third plurality of movable members assume a preselected angle with the engine axis for minimum external boattail-base drag and under supersonic operating conditions said third plurality of members form a substantially parallel cylindrical surface with respect to said axis.

2. The apparatus according to claim 1 wherein under supersonic operating conditions the downstream ends of said third plurality are overlying said same ends of said first plurality to jointly define the nozzle exit area.

3. The apparatus according to claim 1 wherein under subsonic operating conditions said resilient means elongate to permit the respective downstream ends of said first and third pluralities to separate to provide said nozzle with a predetermined base area for minimizing external drag.

4. A variable area convergent-divergent supersonic jet engine exhaust nozzle comprising:
   an inner plurality of longitudinally-extending movable wall means defining an exhaust gas flow passage and exit area in said nozzle;
   means supporting said inner plurality of wall means for pivotal movement about one of the ends thereof for variation of said nozzle exit area;
   an outer plurality of circumferentially-arranged longitudinally-extending movable wall means pivotally supported at the upstream ends thereof in said engine; and
   resilient means connected adjacent the downstream ends of said outer plurality of wall means and responsive to differential pressures on opposite surfaces of said inner and outer wall means, respectively, to cause said downstream ends of said outer plurality of wall means to be spaced from the respective ends of said inner plurality of movable wall means under subsonic operating conditions, wherein said outer wall means form a preselected angle with the engine axis for minimizing boattail-base drag, said respective ends of said pluralities being in an overlying abutting relationship under supersonic operating conditions, said outer wall means forming an outer fairing surface of substantially zero angle with respect to said engine axis.

5. A variable area convergent-divergent supersonic jet engine exhaust nozzle comprising:
   a tailpipe;
   a shroud surrounding said tailpipe in spaced relationship thereto and forming a secondary air passage therewith;
   a plurality of circumferentially-arranged longitudinally-extending primary wall means pivotally supported at their upstream ends from said tailpipe forming the convergent portion of and defining the throat area in said nozzle;
   a plurality of circumferentially-arranged, longitudinally-extending secondary wall means forming the divergent portion of said nozzle, said plurality including an inner series of movable members defining an exhaust gas flow passage and exit area in said nozzle, the upstream ends of said inner series of members being pivotally supported from said shroud, an outer series of movable members pivotally supported at their upstream ends from the downstream end of said shroud, resilient means connecting said outer series to said inner series of movable members adjacent the respective downstream ends thereof and responsive to differential pressures on opposite surfaces of said inner and outer series of movable members, whereby when said engine is operating under supersonic flight conditions the extreme downstream end portions of said inner and outer series of movable members are in an overlying abutting relationship with said outer series extending essentially at a zero angle with respect to the engine axis, and wherein when said engine is operating under subsonic flight conditions said outer series of movable members extend at a predetermined angle downstream of said shroud with respect to the engine axis and the respective extreme downstream end portions of said inner and outer series of movable members are separated to provide a predetermined nozzle base area for minimizing boattail-base drag.

6. The apparatus according to claim 5 wherein said means connecting said outer and inner series of movable members adjacent the respective downstream ends thereof comprise a series of elongated springs equally circumferentially spaced about the engine axis and attached at either of the ends thereof to the outer and inner surfaces, respectively, of said inner and outer series of movable members.

7. The apparatus according to claim 5 wherein said plurality of secondary wall means further includes an intermediate series of movable members circumferentially-arranged about the engine axis, said intermediate members extending from said shroud to said inner series of movable members and being pivotally interconnected therebetween, said intermediate and inner series of movable members forming a cavity receiving pressurized air from said secondary passage, the differential pressures on opposing surfaces of said inner and said intermediate series of movable member, respectively, being controlled for positioning of said members for variation of said nozzle throat and exit areas automatically under changing flight conditions.

8. The apparatus according to claim 7 wherein the ratio of the length ($L_o$) of said nozzle, from the upstream ends of said outer series of movable members to the plane of said exit area, to the longitudinal extension (L) of said inner series of members when in the subsonic operating position is in the range of approximately .5 to .7.

9. The apparatus according to claim 7 wherein the angle said outer series of movable members makes with said engine axis under subsonic operating conditions is in the range of approximately 10°–20°.

10. The apparatus according to claim 8 wherein one end of each of said intermediate series of movable members is connected adjacent the downstream end of said shroud, the other end thereof being connected to the inner series of movable members at a point downstream of a plane containing the upstream ends of said outer series of movable members.

References Cited

UNITED STATES PATENTS

| | | | |
|---|---|---|---|
| 2,926,491 | 3/1960 | Hyde | 239—265.41 |
| 3,053,477 | 9/1962 | Reiniger | 60—232 X |
| 3,057,150 | 10/1962 | Horgan | 239—265.41 X |
| 3,157,027 | 11/1964 | May | 239—265.41 |
| 3,188,803 | 6/1965 | Maguire | 239—265.39 |
| 3,214,904 | 11/1965 | Bailey et al. | 239—265.41 X |

M. HENSON WOOD, JR., *Primary Examiner.*

VAN C. WILKS, *Assistant Examiner.*